US011350659B2

United States Patent
Dsylva

(10) Patent No.: US 11,350,659 B2
(45) Date of Patent: Jun. 7, 2022

(54) FLUID EXTRACTION APPARATUS FOR NATURAL ORGANIC PRODUCTS

(71) Applicant: Nash Dsylva, Batavia, NY (US)

(72) Inventor: Nash Dsylva, Batavia, NY (US)

(*) Notice: Subject to any disclaimer, the term of this patent is extended or adjusted under 35 U.S.C. 154(b) by 133 days.

(21) Appl. No.: 16/739,685

(22) Filed: Jan. 10, 2020

(65) Prior Publication Data

US 2020/0146329 A1 May 14, 2020

Related U.S. Application Data

(62) Division of application No. 15/276,995, filed on Sep. 27, 2016, now Pat. No. 10,575,547.

(60) Provisional application No. 62/245,470, filed on Oct. 23, 2015.

(51) Int. Cl.
*A23N 1/02* (2006.01)
*A23L 2/04* (2006.01)

(52) U.S. Cl.
CPC .............. *A23N 1/02* (2013.01); *A23L 2/04* (2013.01); *A23V 2002/00* (2013.01)

(58) Field of Classification Search
CPC ... A23V 2002/00; A23V 2250/21; A23L 2/04; A23L 3/375; A23L 2/06; A23N 1/02; A23N 1/00; F25D 17/02
See application file for complete search history.

(56) References Cited

U.S. PATENT DOCUMENTS

| | | | | | |
|---|---|---|---|---|---|
| 2,303,768 A | * | 12/1942 | Smith | ...................... | A23N 1/02 99/496 |
| 4,697,508 A | * | 10/1987 | Tallafus | ............... | B65G 33/265 99/517 |
| 5,298,275 A | * | 3/1994 | Balasingham | ............ | A23L 2/02 426/333 |

\* cited by examiner

*Primary Examiner* — Hong T Yoo
(74) *Attorney, Agent, or Firm* — Jennifer Meredith, Esq.; Meredith Attorneys, PLLC

(57) ABSTRACT

A system and method to extract juices or other fluids from natural organic products such as fruits and leafy vegetables. A natural organic product pre-cooled between 42° F. to 49° F. is initially evacuated for about 60 seconds and then aerated for about 90 seconds using nitrogen. After repeating the evacuation and aeration one more time, the aerated product is fed to a triple auger unit where each auger rotates at a speed of approximately 80 RPM to 86 RPM. The outer covers of the augers are pre-cooled to a temperature gradient of 44° F. to 47° F., and fluid extraction is maximized by feeding the extruded material back through the second and third augers. The extruded liquid is pressurized during subsequent filtration and then stored in a temperature-controlled container. Stringent temperature and pressure controls maintain the purity and nutrient strength of the liquid extract, while improving the shelf life.

9 Claims, 1 Drawing Sheet

FLUID EXTRACTION APPARATUS FOR NATURAL ORGANIC PRODUCTS

TECHNICAL FIELD

The present disclosure generally relates to extraction of juice from natural organic products such as fruits and leafy vegetables. More particularly, and not by way of limitation, particular embodiments of the present disclosure are directed to a temperature- and pressure-controlled process in which plant juices are extracted without damaging the beneficial cell membranes of the plants, thereby producing a nutrient-rich output.

BACKGROUND

In today's health-conscious world, many methods have been developed to extract plant juices such as, for example, juices from natural vegetables and fruits. There are three most common methods currently used for such extraction: (i) the hydraulic press method, (ii) the cold expeller method, and (iii) the solvent extraction method.

In the hydraulic press method, pressure is used to extract juice from raw produce. In contrast to the hydraulic press method, the cold expeller method reduces the amount of heat caused during the pressing process. On the other hand, in the solvent extraction method, ground seeds are purged with petroleum distillate to extract oils from the seeds and then the extracted oil is heated to distill out the solvent chemical. The solvent extraction method is utilized because of low costs and high yields.

SUMMARY

Each of the current fluid extraction method mentioned above has its own limitations. For example, the end result—that is, the extracted juice—in the hydraulic press method is subject to oxidation and damage to the fragile cell membranes of the produce. Furthermore, the shelf life of the output product (juice) in the hydraulic press method is only about 90 seconds. The reduced heat in the cold expeller method slows oxidation, which, in turn, keeps more beneficial enzymes intact in the final product. However, the processing environment in the cold expeller method is not controlled and the cell membranes are still damaged. In case of the solvent extraction method, even if the method is performed correctly, a very small amount of petroleum distillate still remains in the extracted oils, causing contamination. Thus, each of the current fluid extraction method delivers the respective product (juice/oil) in a diminished capacity.

It is therefore desirable to address the above-mentioned problems of existing fluid extraction methods so that a nutrient-rich, stable product (juice) is extracted with increased shelf life.

In particular embodiments as per teachings of the present disclosure, cold pressure technology is used in conjunction with computerized control to extract the plant juices—such as, for example, juices from fruits and leafy vegetables—without damaging the beneficial cell membranes. This approach retains the life force energy of the natural nutrients. In certain embodiments of the present disclosure, multiple cycles of synchronized extraction are used under stringent temperature and pressure controls to obtain final products that have better purity and nutrient strength than those obtained using current extraction methods. The computer-controlled process as per teachings of the present disclosure also reduces operating costs, while producing a nutrient-rich stable product with improved shelf life.

In one embodiment, the present disclosure is directed to a method of extracting liquid from a natural organic product such as a leafy vegetable or a fruit. The method comprises: (i) pre-cooling the organic product to a first pre-determined temperature; (ii) evacuating the pre-cooled product for a first pre-determined time period; (iii) aerating the evacuated product for a second pre-determined time period; (iv) feeding the aerated product to a set of pre-cooled augers to extract liquid therefrom, wherein an outer cover of each auger in the set of augers is maintained at a second pre-determined temperature; and (v) collecting the extracted liquid in a containment chamber while maintaining the extracted liquid at the second pre-determined temperature in the containment chamber and also through transit to the containment chamber.

The fluid extraction method as per teachings of particular embodiments of the present disclosure also may be used to extract juices from specific plant roots, bark, certain seeds, and beans.

In one embodiment, the first pre-determined temperature is between 42° F. to 49° F. (Fahrenheit), and the second pre-determined temperature is between 44° F. to 47° F. Furthermore, the first pre-determined time period may be approximately 60 seconds, and the second pre-determined time period may be approximately 90 seconds.

In one embodiment, the evacuated product may be aerated by feeding approximately 10 psi (pounds per square inch) of nitrogen into a storage unit containing the evacuated product, and then aerating the evacuated product for the second pre-determined time period while purging the nitrogen from the storage unit during aeration. In certain embodiments, the evacuation and the aeration steps may be repeated one more time before feeding the aerated product to the set of pre-cooled augers.

In one embodiment, the set of augers may include three augers, each of which may rotate at a speed of approximately 80 RPM (Revolutions Per Minute) to 86 RPM. The aerated product may be sequentially fed to the augers—starting with a first auger, followed by a second auger, and then to a third auger. The extruded output from the third auger may be fed back to the second auger and then to the third auger, in sequence. The extracted liquid may be produced out of the third auger through this re-feeding operation, and may be collected from the third auger into the containment chamber.

In certain embodiments, the extracted liquid coming out of the third auger may be pressurized using nitrogen, and the pressurized liquid may be transported from the third auger to the containment chamber via a series of stainless filters. The extracted liquid is pushed with nitrogen while transiting through the stainless filters, and each stainless filter is maintained at the second pre-determined temperature.

In one embodiment, the present disclosure is directed to a system to extract liquid from a natural organic product. The system comprises: (i) a storage unit that stores the organic product pre-cooled to a first pre-determined temperature; (ii) an aeration chamber connected to the storage unit to receive the pre-cooled organic product therefrom, wherein the aeration chamber initially evacuates the pre-cooled product for a first pre-determined time period and then aerates the evacuated product for a second pre-determined time period; (iii) a plurality of chutes to feed the aerated product from the aeration chamber to an auger unit; (iv) the auger unit that receives the aerated product through the plurality of chutes, wherein the auger unit includes a set of pre-cooled augers that extracts liquid from the aerated product, wherein an outer cover of each auger in the set of augers is maintained at a second pre-determined temperature; (v) a containment chamber that collects the extracted liquid from the auger unit; and (vi) a cooling unit connected to the auger unit and the containment chamber to maintain the extracted liquid at the second pre-determined temperature in the containment chamber and also through transit to the containment chamber from the auger unit.

As noted before, the first pre-determined temperature may be between 42° F. to 49° F., the second pre-determined temperature may be between 44° F. to 47° F., the first pre-determined time period may be approximately 60 seconds, and the second pre-determined time period may be approximately 90 seconds. The aeration may be performed using nitrogen. The auger unit may include three augers, each of which may rotate at a speed of approximately 80 RPM to 86 RPM. The system according to particular embodiments of the present disclosure may be used to perform the earlier-mentioned process steps under specific temperature and pressure conditions outlined before.

In another embodiment, the present disclosure is directed to a method of extracting fluid from a natural organic product. The method comprises: (i) pre-cooling the organic product to a first temperature between 42° F. to 49° F.; (ii) evacuating the pre-cooled product for approximately 60 seconds; (iii) aerating the evacuated product for approximately 90 seconds using nitrogen; (iv) feeding the aerated product to a set of pre-cooled augers to extract fluid therefrom, wherein an outer cover of each auger in the set of augers is maintained at a second temperature between 44° F. to 47° F.; and (v) collecting the extracted fluid in a containment chamber while maintaining the extracted fluid at the second temperature in the containment chamber and also through transit to the containment chamber.

Thus, the fluid extraction process as per the teachings of the present disclosure provides for a method that protects all of the extracted fluid from natural light, air, and room temperature. The bacteria growth is controlled using appropriate temperatures and Ultraviolet (UV) or blue light during processing. The entire system is monitored at various intervals for proper operating temperature and positive pressure. The computer-controlled processing reduces operating costs, while producing a nutrient-rich, stable output (such as, for example, juice) that is preservative-free and has an improved shelf life.

BRIEF DESCRIPTION OF THE DRAWINGS

In the following section, the present disclosure will be described with reference to exemplary embodiments illustrated in the figures, in which.

DETAILED DESCRIPTION

In the following detailed description, numerous specific details are set forth in order to provide a thorough understanding of the disclosure. However, it will be understood by those skilled in the art that the present disclosure may be practiced without these specific details. In other instances, well-known methods, procedures, components and layouts have not been described in detail so as not to obscure the present disclosure.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" or "according to one embodiment" (or other phrases having similar import) in various places throughout this specification are not necessarily all referring to the same embodiment. Furthermore, the particular features, structures, or characteristics may be combined in any suitable manner in one or more embodiments. Also, depending on the context of discussion herein, a singular term may include its plural forms and a plural term may include its singular form. Similarly, a hyphenated term may be occasionally interchangeably used with its non-hyphenated version, and a capitalized entry may be interchangeably used with its non-capitalized version. Such occasional interchangeable uses shall not be considered inconsistent with each other.

Figure 1:
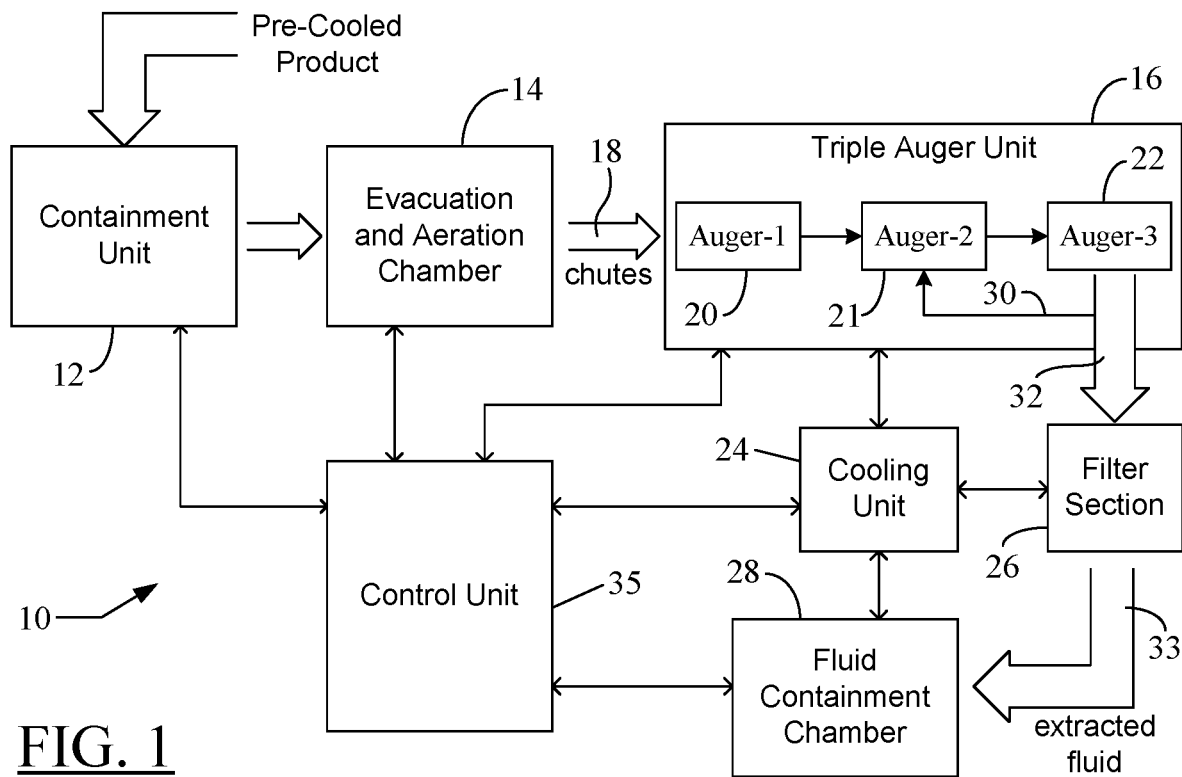
FIG. 1 shows an exemplary fluid extraction system according to one embodiment of the present disclosure.
Figure 2:
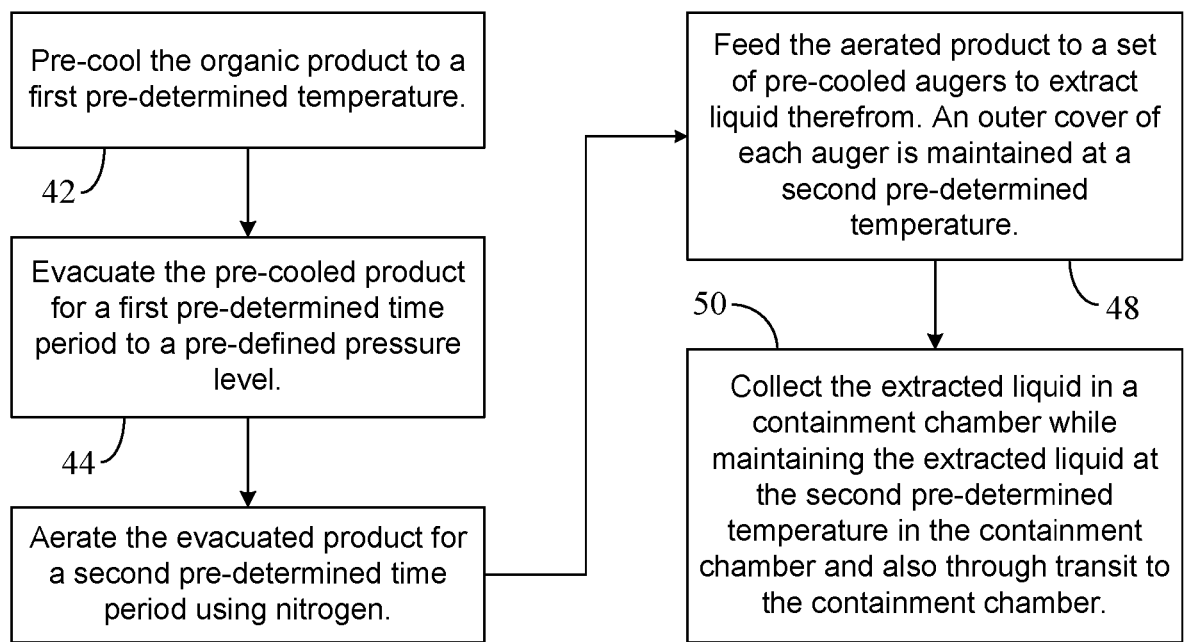
FIG. 2 is an exemplary flowchart of a fluid extraction process according to one embodiment of the present disclosure.

FIG. 1 shows an exemplary fluid extraction system 10 according to one embodiment of the present disclosure. FIG. 2 is an exemplary flowchart 40 of a fluid extraction process according to one embodiment of the present disclosure. The fluid extraction may be performed on a natural organic product, which may be from one of the following categories of organic products: leafy vegetables, fruits, specific plant roots, bark, certain seeds and beans. The juices of these organic products may be extracted in a controlled environment, as discussed below, to obtain a nutrient-rich stable output with an improved bio-active shelf life. For ease of discussion, FIGS. 1 and 2 are described together to explain the operational details of the system 10.

As noted at block 42 in FIG. 2, the natural organic product may be initially pre-cooled to a predetermined temperature so that the core temperature of the product attains that temperature level before any processing begins. In one embodiment, the organic product may be pre-cooled and its core temperature maintained between approximately 42° F. to 49° F. The system 10 may include a containment unit which may be loaded with the raw, pre-cooled product (such as produce). From the containment unit 12, the raw (and pre-cooled) natural product—such as leafy vegetables, fruits, roots, and the like—may be loaded into an evacuation and aeration chamber (more simply, "the aeration chamber") 14 in the system 10. In the aeration chamber 14, the product may be initially evacuated for a first pre-determined time period, as noted at block 44 in FIG. 2. In particular embodiments, the first pre-determined time period may be approximately 60 seconds. In certain embodiments, the evacuation may be carried out in the chamber 14 to a pre-defined pressure level such as, for example, the pressure level of approximately 0 Hg The evacuation may be followed by an aeration operation in the chamber 14. For example, in certain embodiments, the evacuated product may be aerated for a second pre-determined time period, as noted at block 46 in FIG. 2. In one embodiment, the second pre-determined time period may be approximately 90 seconds. As part of the aeration operation, 10 psi of nitrogen may be fed into the chamber 14 and, as the product is aerated for a period of 90 seconds, the nitrogen is purged from the chamber 14 during aeration. During the aeration operation, the product may be kept in motion so that the air is purged from the product and aerated thoroughly to reduce moisture. In particular embodiments, the evacuation and the aeration operations may be repeated at least one more time before the aerated product is fed to an auger unit 16 via chutes 18. For ease of discussion, the numeral "18" is used to refer to the chutes, which are symbolically illustrated using the arrow designated with reference numeral "18." As shown, in the embodiment of FIG. 1, the auger unit 16 includes three augers 20-22 and, hence, it may be referred to as the "triple auger unit." The number of augers may be different in other embodiments.

As noted at block 48 in FIG. 2, the aerated product—coming out of the aeration chamber 14—may be fed to the set of augers 20-22 to extract liquid therefrom. As mentioned above, in one embodiment, the raw natural product from the aeration chamber 14 may be fed to the auger unit 16 through the chutes 18. The augers 20-22 may be stainless augers encased in tubular stainless shielding (or outer covers). In one embodiment, each auger 20-22 may rotate at a speed of approximately 80 RPM to 86 RPM to keep the heat and friction to a minimum. The outer cover of each auger 20-22 may be maintained at a pre-determined temperature to keep the augers 20-22 pre-cooled to that temperature before they receive the raw product via the chutes 18. In particular embodiments, the temperature of the outer covers of the augers 20-22 may be pre-cooled to a temperature gradient of approximately 44° F. to 47° F. using water, which has been pre-cooled through a series of chillers (not shown) in a cooling unit 24 of the system 10. The cooling unit 24 may be connected to the auger unit 16, to a filter section 26, and to a fluid containment chamber 28 to feed and cycle the pre-cooled water through the entire operational portion of the system 10 to maintain the desired temperature throughout the processing of the raw product. In one embodiment, such temperature may be in the range of approximately 44° F. to 47° F. In particular embodiments, it may be preferable that this temperature does not fall below 42° F. or rises above 49° F.

In the embodiment of FIG. 1, the aerated product received through the chutes 18 may be fed to the augers 20-22 in a sequential manner. In other words, the first auger 20 may initially receive the aerated product from the chutes 18 and process it. The output of the first auger 20 may be provided to the second auger 21 for processing, and the output of the second auger 21 may be sent to the third auger 22 for processing. In certain embodiments, the extruded output at the third auger 22 may be re-fed in sequence back to the second auger 21 and then again to the third auger 22, as indicated by the exemplary arrow 30 in FIG. 1. Such re-feeding may occur at least once to maximize the liquid output.

As noted at block 50 in FIG. 2, the extracted liquid produced by the third auger 22 after the re-feeding operation may be collected from the third auger 22 into the fluid containment chamber 28. The exemplary arrows 32-33 in FIG. 1 illustrate this collection operation. As also noted at block 50 in FIG. 2, throughout the collection operation, the extracted liquid being received from the third auger 22 may be maintained at the same temperature as that was kept in the auger unit 16 so as not to damage the nutrients in the liquid. Thus, the extracted liquid may be maintained at the temperature of approximately 44° F. to 47° F. not only in the containment chamber 28, but also through its transit to the containment chamber. In the embodiment of FIG. 1, the extracted fluid out of the third auger 22 may pass through a stainless piping system (not shown) connecting the third auger 22 with the containment chamber 28 via a series of stainless filters (not shown) in the filter section 26. The entire piping system and the stainless filters may be maintained at the temperature of approximately 44° F. to 47° F. by the cooling unit 24.

Once extruded, the volume of liquid coming out of the third auger 22 may be monitored through a series of flow meters (not shown), which may measure the fluid flow in, for example, US gallons per hour. In certain embodiments, the extracted liquid coming out of the third auger 22 may be pressurized, for example at 3.5 psi, using nitrogen as it enters the containment chamber 28 through the filter section 26. In one embodiment, the pressurized liquid is transported from the third auger 22 to the containment chamber 28 via the series of stainless filters, and is constantly being pushed with nitrogen while transiting through the stainless filters. As noted before, the entire stainless piping system—including the stainless filters—that the fluid passes through may be maintained at the temperature of approximately 44° F. to 47° F. by the cooling unit 24.

In one embodiment, the containment chamber 28 for the fluid may be constructed using 304 stainless steel, may hold up to 275 US gallons of fluid, and may withstand a maximum pressure of approximately 13 psi at full fluid capacity.

A control unit 35 may be part of the system 10 and configured to control operations of the containment unit 12, the aeration chamber 14, the auger unit 16, the cooling unit 24, and the containment chamber 28. In FIG. 1, various bi-directional arrows are shown illustrating the connection of the control unit 35 to each of these entities. In certain embodiments, the control unit 35 may also control the operations of the filters in the filter section 26. The control unit 35 may be, for example, a computer system, a Computer Numeric Control (CNC) machine, an industrial control unit, or any other data processing system that is suitably programmed to make it operable to perform various monitoring and control operations needed to coordinate and carry-out the operations of various components in the system 10. For example, the control unit 35 may receive and monitor data from various temperature and pressure sensors (not shown) in the system 10 so as to maintain the necessary temperature and pressure conditions during the juice extraction process. Based on the sensor data, the control unit 35 may "instruct" the cooling unit 24 to adjust the temperature gradient as needed to maintain the proper processing environment. As another example, the control unit 35 may "trigger" the loading of the raw product from the containment unit 12 to the aeration chamber 14, continuously monitor the feedback received from the aeration chamber 14 to make sure that the evacuation and aeration operations are carried out under the correct operating conditions, interpret the data from the flow meter (not shown) to determine when the containment chamber 28 is full, maintain synchronization of operations among various system components, and the like. In particular embodiments, the control unit 35 may also monitor error conditions or failure events occurring at one or more components in the system 10 so as to raise appropriate audible and/or visible alarms for the operator. Such error conditions may be reported in the data from various sensors in the system 10. Thus, the control unit 35 may perform overall monitoring and control of the fluid extraction process being carried out through various mechanical units/components in the system 10.

Thus, the entire extraction process discussed with reference to the embodiments in FIGS. 1-2 protects all of the extracted fluid from natural light, air, and room temperature. The enclosed chutes, containers/chambers, and pipes, under proper operating temperature, may facilitate a controlled processing environment that protects the extracted liquid as much as feasible. The bacteria may be controlled with the above-mentioned temperatures used during the extraction process. Furthermore, Ultraviolet (UV) or blue light may be used in the system 10 to aid in the control of the bacteria. The entire system may be monitored at various intervals— for example, using the control unit 35—for proper operating temperature and positive pressure. The computer-controlled processing in the embodiment of FIG. 1 may reduce operating costs, while producing a nutrient-rich, stable output. The bio-active shelf life of the output liquid is improve as well, even though it varies and depends on the specific organic products extracted. Additionally, it is observed here that the processing method as per teachings of the present disclosure is preservative-free and results in an improved shelf life for the extracted fluid/juice.

In the preceding description, for purposes of explanation and not limitation, specific details are set forth (such as particular structures, components, techniques, etc.) in order to provide a thorough understanding of the disclosed extraction process. However, it will be apparent to those skilled in the art that the disclosed process may be performed in other embodiments that depart from these specific details. That is, those skilled in the art will be able to devise various arrangements which, although not explicitly described or shown herein, embody the principles of the disclosed process. In some instances, detailed descriptions of well-known components and processing methods are omitted so as not to obscure the description of the disclosed process with unnecessary detail. All statements herein reciting principles, aspects, and embodiments of the disclosed system and process, as well as specific examples thereof, are intended to encompass both structural and functional equivalents thereof. Additionally, it is intended that such equivalents include both currently known equivalents as well as equivalents developed in the future, such as, for example, any elements developed that perform the same function, regardless of structure.

Alternative embodiments of the fluid extraction system and process according to inventive aspects of the present disclosure may include additional components responsible for providing additional functionality, including any of the functionality identified above and/or any functionality necessary to support the solution as per the teachings of the present disclosure. Although features and elements are described above in particular combinations, each feature or element can be used alone without the other features and elements or in various combinations with or without other features.

The foregoing describes a process to extract juices or other fluids from natural organic products such as fruits, leafy vegetables, plant roots, seeds, and the like. In the process, a natural organic product pre-cooled between 42° F. to 49° F. is initially evacuated for about 60 seconds and then aerated for about 90 seconds using nitrogen. After repeating the evacuation and aeration one more time, the aerated product is fed to a triple auger unit where each auger rotates at a speed of approximately 80 RPM to 86 RPM. The outer covers of the augers are pre-cooled to a temperature gradient of 44° F. to 47° F., and fluid extraction is maximized by feeding the extruded material back through the second and third augers. The extruded liquid is pressurized during subsequent filtration and then stored in a temperature-controlled container. The process allows for extraction of fluids/juices without damaging the beneficial cell membranes, thus retaining the life force energy of the natural nutrients. This maintains the purity and nutrient strength of the resulting output (or extracted fluid), while improving the shelf life of the liquid extract.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed:

1. A system to extract liquid from a natural organic product, said system comprising:
   a storage unit that stores the organic product pre-cooled to a first pre-determined temperature;
   an aeration chamber connected to the storage unit to receive the pre-cooled organic product therefrom, wherein the aeration chamber initially evacuates the pre-cooled product for a first pre-determined time period, then receives nitrogen into the aeration chamber and then aerates the evacuated product for a second pre-determined time period while purging the nitrogen from the aeration chamber;
   a plurality of chutes to sequentially feed the aerated product from the aeration chamber to an auger unit;
   the auger unit that receives the aerated product through the plurality of chutes, wherein the auger unit includes an enclosed set of at least two pre-cooled augers that extracts liquid from the aerated product, wherein an outer cover of each auger in the set of augers is maintained at a second pre-determined temperature;
   a containment chamber that collects the extracted liquid from the auger unit; and
   a cooling unit connected to the auger unit and the containment chamber to maintain the extracted liquid at the second pre-determined temperature in the containment chamber and also through transit to the containment chamber from the auger unit.

2. The system of claim 1, wherein at least one of the following applies:
   the first pre-determined temperature is between 42° F. to 49° F.; and
   the second pre-determined temperature is between 44° F. to 47° F.

3. The system of claim 1, wherein the natural organic product is from one of the following categories of organic products:
   a leafy vegetable;
   a fruit;
   a plant root;
   a bark;
   a seed; and
   a bean.

4. The system of claim 1, wherein at least one of the following applies:
   the first pre-determined time period is approximately 60 seconds; and
   the second pre-determined time period is approximately 90 seconds.

5. The system of claim 1, wherein the pre-cooled organic product is maintained in motion while passing through the aeration chamber, and wherein the aeration chamber receives approximately 10 pounds per square inch (psi) of nitrogen and aerates the evacuated product for the second pre-determined time period while purging the nitrogen from the aeration chamber during aeration.

6. The system of claim 1, wherein the aeration chamber performs evacuation and aeration operations two times before feeding the aerated product to the plurality of chutes.

7. The system of claim 1, wherein the set of augers includes three augers, wherein each of the three augers rotates at a speed of approximately 80 Revolutions Per Minute (RPM) to 86 RPM, and wherein the auger unit is operable to perform the following:
- sequentially feed the aerated product starting with a first auger in the set of augers to a second auger in the set of augers and then to a third auger in the set of augers;
- sequentially re-feed extruded output from the third auger to the second auger and again to the third auger, thereby producing the extracted liquid; and
- transfer the extracted liquid from the third auger to the containment chamber.

8. The system of claim 7, further comprising:
- a filter section including a series of stainless filters, wherein each stainless filter is maintained at the second pre-determined temperature,
- wherein the extracted liquid coming out of the third auger is pressurized using nitrogen, and wherein the pressurized liquid is transported from the third auger to the containment chamber using the series of stainless filters such that the extracted liquid is pushed with nitrogen while transiting through the stainless filters.

9. The system of claim 1, further comprising:
- a control unit operable to control operations of the storage unit, the aeration chamber, the auger unit, the cooling unit, and the containment chamber.

\* \* \* \* \*